United States Patent
Leonard et al.

(10) Patent No.: US 6,763,289 B2
(45) Date of Patent: Jul. 13, 2004

(54) SYSTEM, BYPASS APPARATUS AND METHOD OF OPERATING A STORE OF A FIRST PREDETERMINED TYPE

(75) Inventors: James V. Leonard, St. Charles, MO (US); Richard E. Meyer, Florissant, MO (US); William Joseph Ebert, Jr., Kirkwood, MO (US)

(73) Assignee: The Boeing Company, Seattle, WA (US)

(*) Notice: Subject to any disclaimer, the term of this patent is extended or adjusted under 35 U.S.C. 154(b) by 0 days.

(21) Appl. No.: 10/199,867

(22) Filed: Jul. 19, 2002

(65) Prior Publication Data

US 2004/0015273 A1 Jan. 22, 2004

(51) Int. Cl.[7] .............................................. B64C 7/00
(52) U.S. Cl. .......................... 701/3; 340/945; 244/3.1
(58) Field of Search ........................ 701/3, 1; 340/945; 244/3.1, 2, 3.15, 3.11, 3.14, 3.19

(56) References Cited

U.S. PATENT DOCUMENTS

| | | |
|---|---|---|
| 5,036,465 A | 7/1991 | Ackerman, Jr. et al. |
| 5,541,839 A * | 7/1996 | Mitzkus et al. ............ 244/3.16 |
| 5,548,510 A | 8/1996 | Ebert et al. |
| 5,614,896 A * | 3/1997 | Monk et al. ................ 340/945 |
| 5,931,874 A | 8/1999 | Ebert et al. .................... 701/1 |
| 6,122,569 A | 9/2000 | Ebert et al. .................... 701/3 |
| 6,349,898 B1 | 2/2002 | Leonard et al. ............ 244/3.15 |

FOREIGN PATENT DOCUMENTS

EP    1 001 242 A1    5/2000

* cited by examiner

Primary Examiner—Marthe Y. Marc-Coleman
(74) Attorney, Agent, or Firm—Alston & Bird LLP

(57) ABSTRACT

A system for operating and releasing a store of a first predetermined type includes an aircraft adapted to control the operation of stores of a second predetermined type and a bypass apparatus. The store is releasably secured to the aircraft, and the aircraft is capable of releasing the store. The aircraft is capable of being configured such that a store of the first predetermined type is capable of operating independent of operating instructions. The bypass apparatus is carried by the aircraft and adapted to facilitate operation of the store. The bypass apparatus can store operating instructions and thereafter transmit the operating instructions into the store. As such, after the aircraft releases the store the store is capable of operating according to the operating instructions. Also, the system can include an umbilical cable disposed between the aircraft and the store. The bypass apparatus can, therefore, be disposed within the umbilical cable.

18 Claims, 8 Drawing Sheets

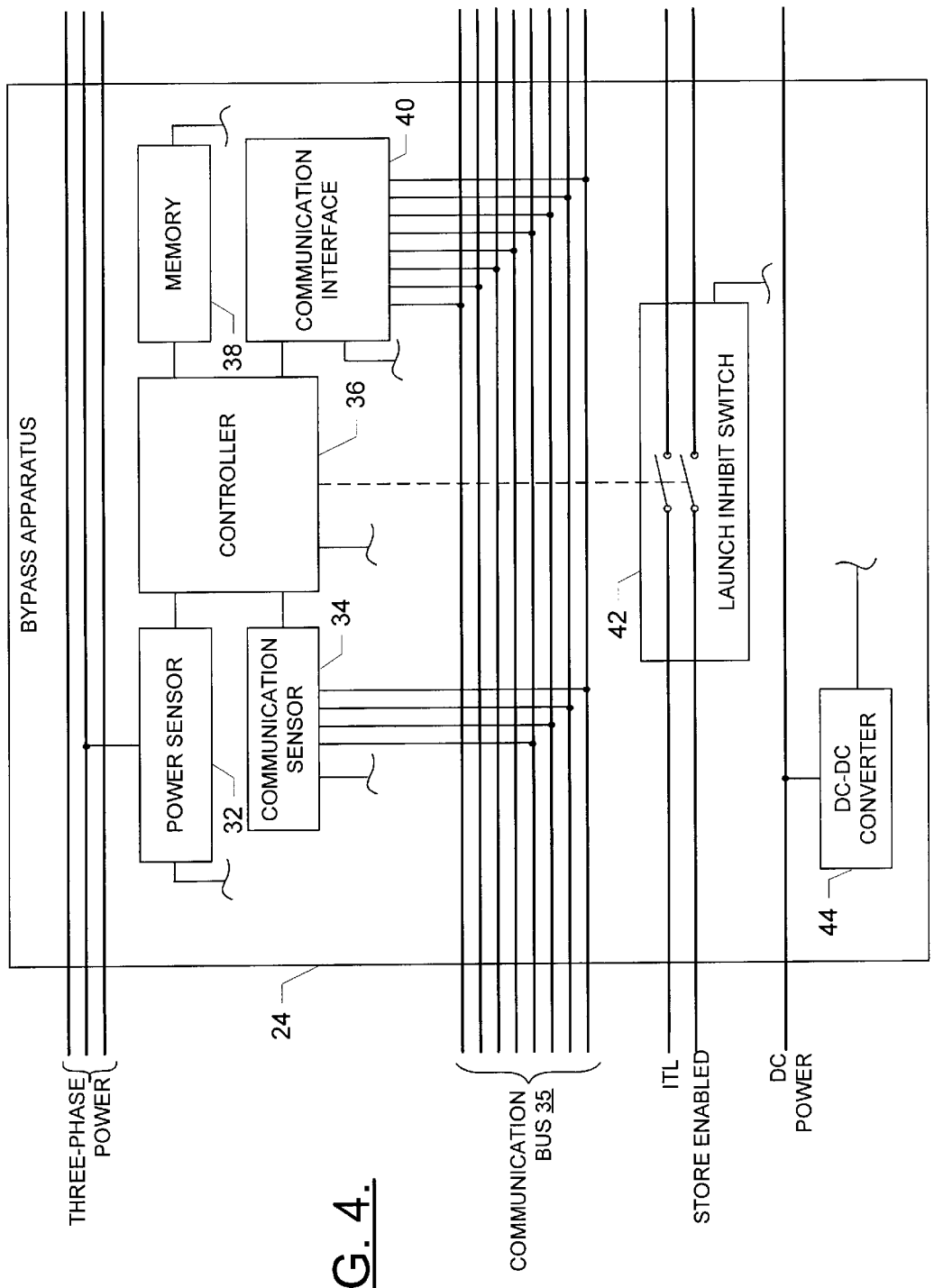

SYSTEM, BYPASS APPARATUS AND METHOD OF OPERATING A STORE OF A FIRST PREDETERMINED TYPE

FIELD OF THE INVENTION

The present invention relates generally to systems and methods of operating a store of a first predetermined type and, more particularly, to systems, bypass apparatuses and methods of operating a store of a first predetermined type from an aircraft adapted to control operation of stores of a second predetermined type.

BACKGROUND OF THE INVENTION

Modern aircraft, such as the F-15 aircraft manufactured by the assignee of the present invention, and the P-3, the S-3 and the F-16 aircraft manufactured by Lockheed Aeronautical Systems Company, are adapted to carry stores. These stores can, for example, include missiles, such as the Stand-off Land Attack Missile (SLAM), the Harpoon Block I missile, and the Harpoon Block II missile. A missile is generally mounted to the wing of a host aircraft, typically via disconnectable pylons, such that the aircraft can carry the missile to the vicinity of the target destination prior to its deployment.

Typically, aircraft include provisions to carry and launch stores of a predetermined type. For example, aircraft such as the P-3 aircraft typically have provisions to carry and launch Harpoon Block I missiles. The aircraft provisions can include aircraft wiring and a weapon control subsystem, such as a Harpoon Aircraft Command and Launch Control System (HACLCS). In this regard, the weapon control subsystem can provide pre-launch power and control signals to develop and load mission and target parameters into the store, and then provide launch functions to the store and thereafter and release the store. Generally, the store is attached to the aircraft at a weapon store pylon that provides the mechanical mounting and release mechanisms and the electrical connection for the power, control and communication link with the weapon control subsystem within the aircraft. In turn, a short umbilical cable normally provides the electrical connection between the store and the aircraft. In this regard, the umbilical cable is typically mechanically restrained and electrically connected to the aircraft pylon on one end, and electrically connected through a releasable connector at a store umbilical connector at the other end.

Generally, Harpoon Block II missiles include the same umbilical interface connection to the aircraft pylon as Harpoon Block I missiles. Harpoon Block II missiles also use the same electrical power and control specification and connector pin assignments as Harpoon Block I missiles. In contrast to Harpoon Block I missiles, however, Harpoon Block II missiles have a more sophisticated flight control system that allows precision GPS-aided navigation to targets that cannot be assigned to Harpoon Block I missiles. The GPS-aided navigation system allows the Harpoon Block II missile to fly a more complex mission engagement path using parameters that must be preplanned and stored in the weapon's volatile memory before launch. Because Harpoon Block II missiles typically only include volatile memory, once the parameters are loaded into the Harpoon Block II memory, power must be continuously applied or the engagement plan parameters will be lost.

Whereas aircraft such as the P-3 aircraft are capable of operating Harpoon Block I missiles or SLAM missiles, such aircraft are not typically capable of operating the more sophisticated features of Harpoon Block II missiles. In this regard, such aircraft currently do not have the engagement planning capability to develop the needed GPS navigation parameters and then load them into the Harpoon Block II store while in flight. To equip the aircraft with the in-flight engagement planning and mission loading capability would required modifying the aircraft wiring and/or the mission control subsystem, which would be very costly and require recertification of the aircraft and the weapon control subsystem. Also, loading preplanned missions while still on the ground with ground support loading equipment would require that the memory banks in the Harpoon Block II missile be continuously in the powered-on state, a mode not currently provided.

SUMMARY OF THE INVENTION

In light of the foregoing background, the present invention provides a system, bypass apparatus and method of operating a store of a first predetermined type from an aircraft adapted to control the operation of stores of a second predetermined type. The system, bypass apparatus and method of embodiments of the present invention allow a store of the first predetermined type to be provided with an engagement plan in-flight without modifying the aircraft wiring and/or the mission control subsystem of the aircraft. By providing the engagement plan to the store in-flight, the system, bypass apparatus and method of embodiments of the present invention also do not require the memory banks in the store to be continuously in a powered-on state.

According to one aspect of the present invention a system for operating and releasing a store of a first predetermined type includes an aircraft adapted to control the operation of stores of a second predetermined type and a bypass apparatus. For example, the store can comprise a store of a Harpoon Block II type, and the aircraft can comprise an aircraft adapted to control the operation of stores of a SLAM type or a Harpoon Block I type. The store is releasably secured to the aircraft. In this regard, the aircraft is capable of releasing the store. Also, to allow operation of the store of the first predetermined type, the aircraft is capable of being configured such that a store of the first predetermined type is capable of operating independent of operating instructions (i.e., engagement plan parameters) from the aircraft. For example, the aircraft can be configured in a line-of-sight mode.

The bypass apparatus is carried by the aircraft and adapted to facilitate operation of the store. The bypass apparatus can store operating instructions and thereafter transmit the operating instructions into the store during flight of the aircraft. As such, after the aircraft releases the store the store is capable of operating according to the operating instructions. Also, the system can include an umbilical cable disposed between the aircraft and the store. The bypass apparatus can, therefore, be disposed within the umbilical cable. The bypass apparatus can include a memory and a controller.

The memory is capable of storing operating instructions, where the operating instructions are adapted for a store of the first predetermined type. In turn, the controller is capable of transmitting the operating instructions into the store such that after the aircraft releases the store, the store is capable of operating according to the operating instructions. The controller can also be capable of verifying the operating instructions. More particularly, the controller can be capable of transmitting the operating instructions into the store when no operating instructions are transmitted from the aircraft. In this regard, the bypass apparatus can also include a communication sensor capable of monitoring communications between the aircraft and the store of the first predetermined type for operating instructions transmitted from the aircraft.

In operation, a method of operating a store of a first predetermined type from the aircraft begins by storing operating instructions within the bypass apparatus. After the operating instructions are stored, the operating instructions can be verified, if so desired. The aircraft is then configured such that a store of the first predetermined type is capable of operating independent of operating instructions from the aircraft. For example, the aircraft can be configured in the line-of-sight mode. Next, during flight of the aircraft, the operating instructions within the bypass apparatus are transmitted into the store. Before operating instructions are transmitted into the store, communications between the aircraft and the store can be monitored for operating instructions transmitted from the aircraft. In this regard, the operating instructions can be transmitted into the store when no operating instructions are transmitted from the aircraft.

After the operating instructions have been transmitted to the store, the store is released from the aircraft and thereafter operated according to the operating instructions. Before transmitting the operating instructions and releasing the store, however, the store can be tested. And if the store fails the test, the operating instructions can be prevented from being transmitted to the store, and the store can be prevented from being released from the aircraft.

BRIEF DESCRIPTION OF THE DRAWINGS

The above and other objects, features, and advantages of the invention will become more apparent from the following description of certain preferred embodiments thereof, when taken in conjunction with the accompanying drawings in which:

FIG. 4 is a block diagram of one embodiment of the bypass apparatus of the present invention.

DETAILED DESCRIPTION OF THE DRAWINGS

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Figure 1:
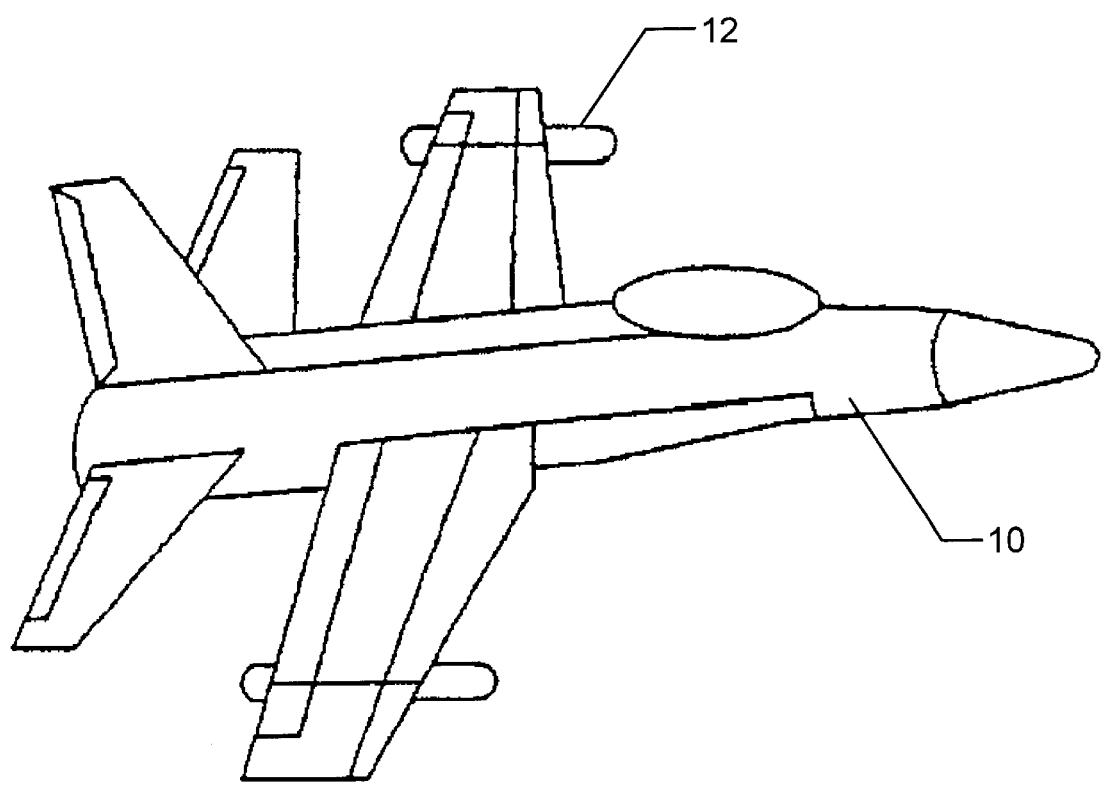
FIG. 1 is a perspective view showing an aircraft carrying a missile store.

Referring now to FIG. 1, an aircraft 10 and one type of associated store is illustrated. The aircraft is generally adapted to control the operation of stores of a second predetermined type, such as Harpoon Block I missiles or SLAM missiles. The aircraft can comprise any number of aircraft adapted to control the operation of stores such as Harpoon Block I missiles. For example, the aircraft can comprise a P-3 maritime patrol aircraft manufactured by Lockheed Aeronautical Systems Company.

A missile 12 represents one type of associated store that may be carried on the aircraft. The missile is of a first predetermined type, and can comprise a Harpoon Block II missile, as such is known. The aircraft 10 and missile are generally adapted to process signals in accordance with a communications format, preferably the signal format known as Harpoon MK 82 Digital Data Bus. As is known to those skilled in the art, the MK 82 Digital Data Bus provides four signals, including three input signals consisting of a clock strobe, a missile data out signal consisting of 16 bits plus a parity bit, and a data enable signal, and one output signal (a data in signal). As used herein, stores of the second predetermined type may be described as Harpoon Block I missiles, and stores of the first predetermined type may be described as Harpoon Block II missiles. It will be understood, however, that the type of stores can vary without departing from the spirit and scope of the present invention. For example, stores of the second predetermined type can comprise SLAM missiles.

Figure 2A:
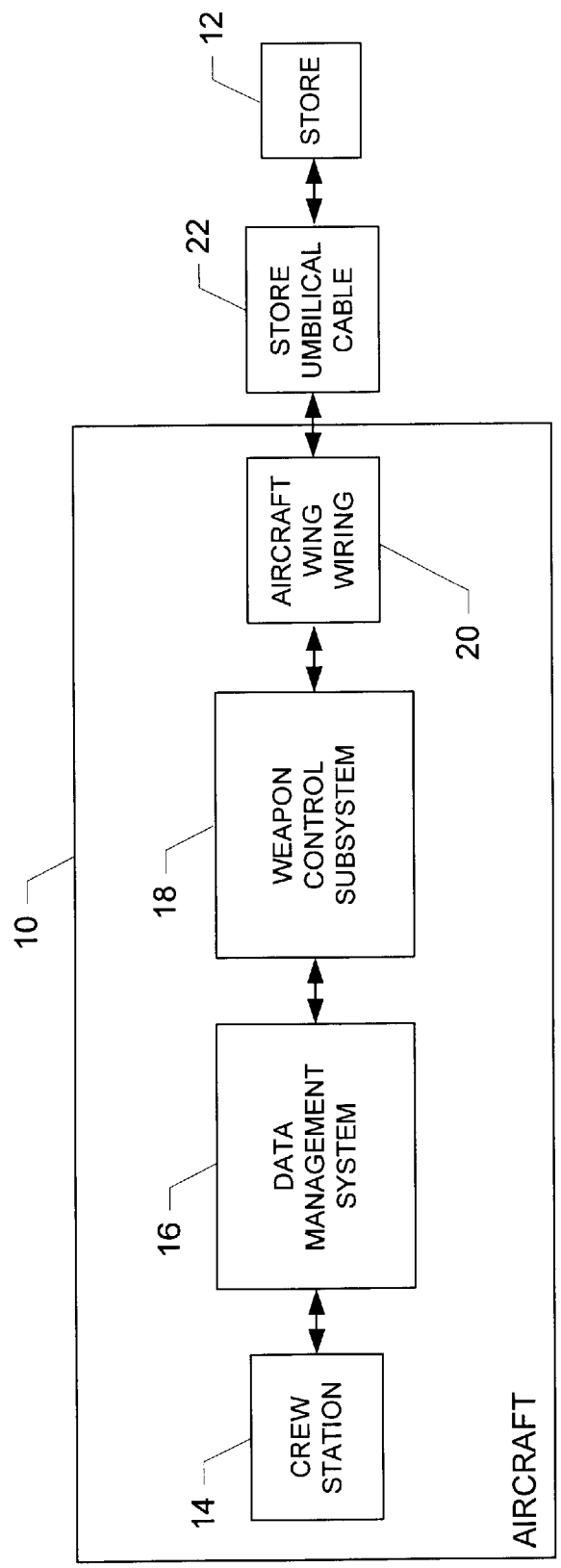
FIG. 2A is a block diagram illustrating a system for operating and releasing a store of a first predetermined type according to one embodiment of the present invention.

As illustrated in FIG. 2A, the aircraft 10 includes a crewstation 14 that generally contains a plurality of controls and display devices, such as head-down and head-up video displays, a control stick, and a throttle, which are used by an aircrew to fly the aircraft and to interact with, and deploy, the associated stores. In this regard, the crewstation controls and display devices communicate with a data management system 16, which controls the overall operation of many of the aircraft subsystems, such as during the launch sequence of the store 12. The data management system communicates with a number of other avionics equipment, such as a weapon control subsystem 18. The weapon control subsystem comprises, for example, a Harpoon Aircraft Command and Launch Control System (HACLCS), that is typically used in conjunction with the deployment of Harpoon Block I missiles. The weapon control subsystem provides the missiles with power, typically three-phase AC power and 28 V DC power. In this regard, missiles such as Harpoon Block I missiles typically include a power converter for receiving the three-phase power from the weapon control subsystem. Also, the weapon control subsystem typically provides commands to control and propulsion systems of the missiles to trigger deployment of the missile, and the weapon control subsystem typically receives status from sensors and the control systems to thereby indicate a status of the missiles.

The weapon control subsystem 18 includes a control panel that allows an operator to choose a mode of operation of the aircraft 10 in controlling the operation of the store 12. Also, the control panel of the weapon control subsystem allows the operator to enter a target range and bearing, a seeker search area size, and the aircraft speed, altitude and attitude, as will be appreciated by those skilled in the art. In addition, the control panel allows the operator to "Select" (i.e., apply three-phase and DC power to selected missile) and to "Release" (i.e., initiate internal store batteries and launch an active store from the aircraft) the desired missile. Typically, the weapon control subsystem transmits commands to the store that allow the store to receive and use the applied power when "Select" is initiated. Also, the commands cause the store to activate internal systems to a launch condition when the "Release," sometimes referred to as an Intent-to-Launch (ITL), is initiated. The store can transmit status discrete signals to the weapon control subsystem to indicate the state of the missile and to "Enable" the weapon control subsystem to open hooks on the aircraft that release the store from the pylon. In this regard, with only the power and the ITL command applied to the store and the enable status returned to the aircraft, the aircraft can launch the store.

Figure 2B:
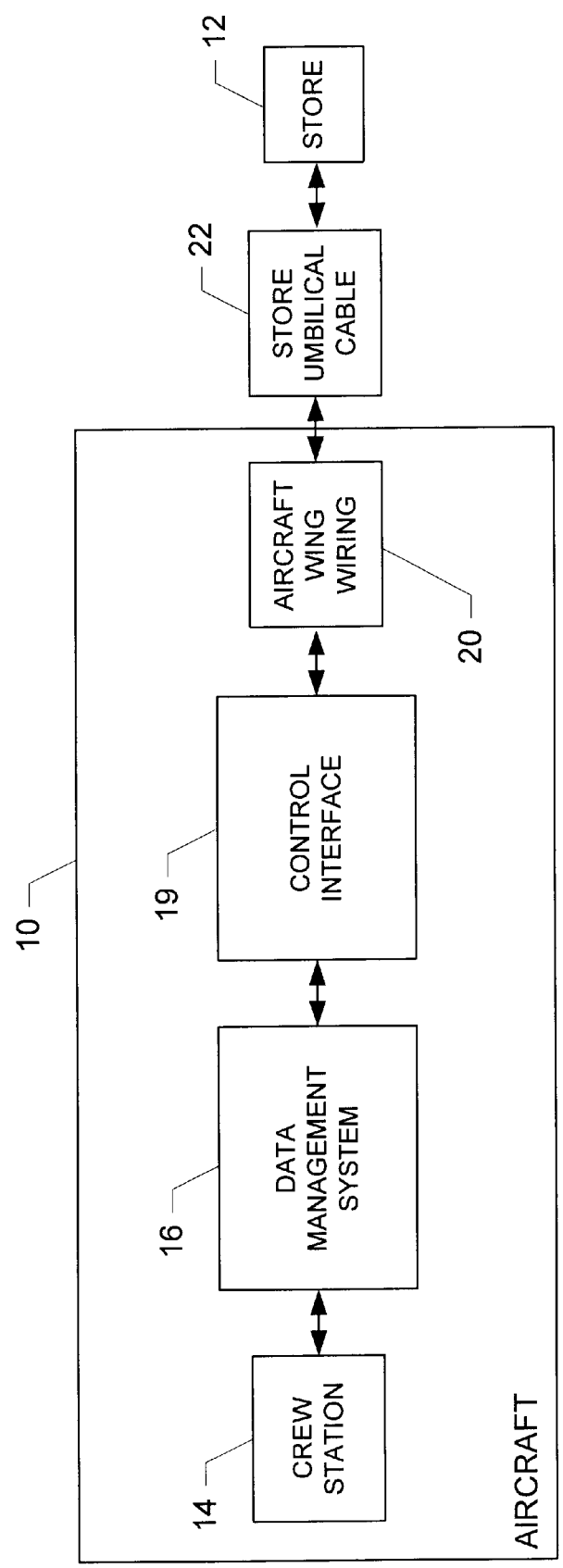
FIG. 2B is a block diagram illustrating a system for operating and releasing a store of a first predetermined type according to another embodiment of the present invention.

At this point it should be noted that some aircraft 10, such as the F-15 and USAF F-16 aircraft, while capable of launching a store 12 such as the Harpoon Block II missile, do not include the weapon control subsystem 18 required to provide power to the store and transmit and receive commands and status discrete signals, respectively, to and from the store. In such an instance, the aircraft can include a control interface 19, as shown in FIG. 2B. The control interface can comprise any of a number of different devices capable of performing the functions of the weapon control subsystem as described herein. In this regard, the control interface can be capable of launching the store provided the control interface is capable of providing power and the ITL command to the store. According to one embodiment, the control interface comprises a Harpoon Universal Launch Adapter Unit (HULAU), as such is known to those skilled in the art.

The aircraft 10 also includes aircraft wing wiring 20 routed to wing pylons through an umbilical cable 22 that provides the aircraft power and control signals to the store 12, and the status signals from the store to the weapon control subsystem 18. The wiring also provides a communication bus 35 (shown in FIG. 4), such as a MK-82 Digital Data bus, that allows bi-directional communication between the weapon control subsystem and a processor (e.g., GNU) onboard the store. Typically, the aircraft wing wiring for the MK-82 Digital Data bus is used to load stores such as Harpoon Block I missiles with range, bearing altitude, speed, attitude and search parameters prior to launch of the store, as such are known to those skilled in the art.

As is also known by those skilled in the art, Harpoon Block I missiles can be launched in any of a number of modes and, thus, the aircraft 10 can be configured in any of such modes in controlling the operation of the store 12. In this regard, Harpoon Block I missiles can be configured for operation in one of three modes, including the Range and Bearing Launch (RBL), the Bearing Only Launch (BOL), and the Line Of Sight Launch (LOS). In RBL mode, Harpoon Block I missiles are given the range and bearing of the target and missile attack and search pattern option (small, medium or large), as well as the aircraft altitude, attitude and true air speed prior to launch. In operation in RBL mode, then, Harpoon Block I missiles typically fly the commanded bearing to a distance equal to the commanded range and then perform a commanded seeker search, and perform the commanded attack.

In BOL mode, the range to the target is unknown and not given to the Harpoon Block I missile before launch. In this regard, in BOL mode the missile is given the bearing of the target as well as the aircraft altitude, attitude and true air speed and the missile attack and BOL search pattern. In operation in BOL mode, then, Harpoon Block I missiles generally fly the commanded bearing and altitude while performing the commanded search for the target. And when the radar seeker detects a target, the missile performs the commanded attack.

In LOS mode, no data is loaded into the Harpoon Block I missile prior to launch and the communications bus 35 is in an inactive state. More particularly, in LOS mode, Harpoon Block I missiles are not given target range and bearing or search and attack commands prior to launch. Also, in the LOS mode Harpoon Block I missiles must determine the launch parameters in-flight as the aircraft altitude, attitude and speed are not loaded into the store before launch. In this regard, in operation in LOS mode, Harpoon Block I missiles will typically continue to fly the bearing and attitude it had at the time of launch and will search and attack the first target encountered using default settings.

Figure 3:
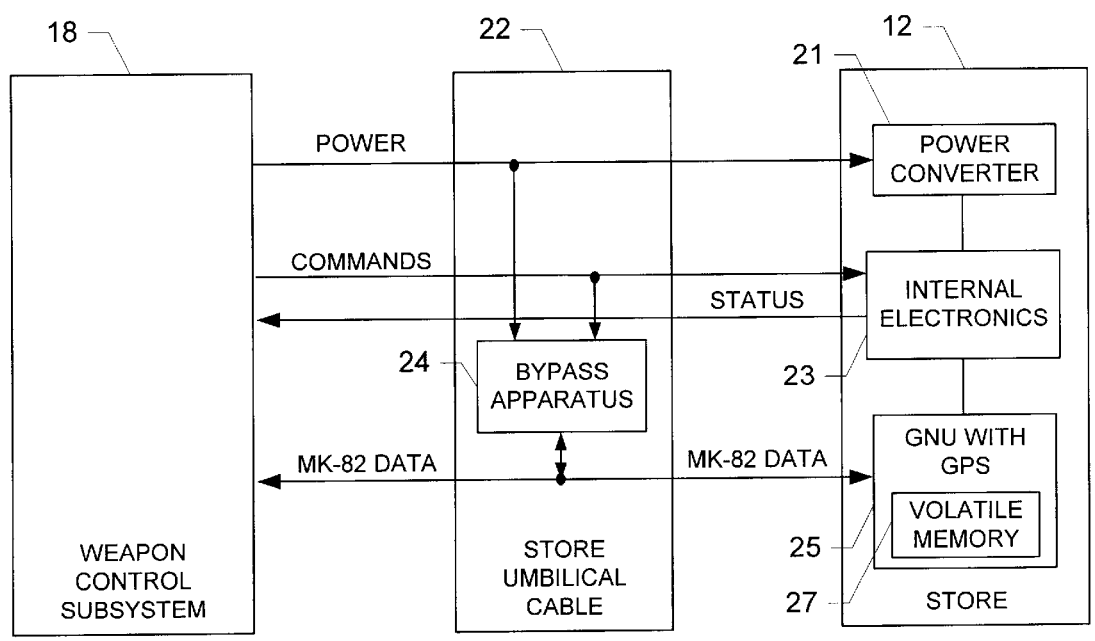
FIG. 3 is a block diagram illustrating the system of FIG. 2A highlighting a bypass apparatus according to one embodiment of the present invention.

Also, as is also known by those skilled in the art, and as shown in FIG. 3, stores 12 such as Harpoon Block II missiles, have the same interface, wire for wire, as the Harpoon Block I missiles described above and can function in all the same modes as Harpoon Block I missiles against targets at sea. Thus, like Harpoon Block I missiles, stores such as Harpoon Block II missiles typically include a power converter 21 for receiving three-phase power from the weapon control subsystem. Also, Harpoon Block II missiles also typically include internal electronics 23 such as sensors, control and propulsion systems that control operation of the missile and, thus, receive commands from the weapon control subsystem and provide status discretes to the weapon control subsystem. Unlike Harpoon Block I missiles, however, Harpoon Block II missiles include a global positioning system (GPS) receiver system referred to as a Guidance and Navigation Unit (GNU) 25 that provides precision strike capability to attack fixed land targets with known locations. Attacking fixed land targets requires a route from the launch point to the target that avoids obstacles, such as certain threat installations, terrain obstacles and populated areas. In this regard, the GNU typically includes an internal volatile memory 27 capable of storing a route in the form of an engagement plan including engagement plan parameters.

Route planning for a Harpoon Block II missile, sometimes referred to as engagement planning, requires the use of a computer, such as a personal computer operating engagement planning application software having Harpoon Block II performance algorithms, terrain maps of the target and vicinity and a GPS Almanac. In operation, a Harpoon Block II missile can execute five major turns, or "waypoints," from the point of launch to the target. Based upon the waypoints, then, the route and the approach angle to the target can be selected for the Harpoon Block II missiles. The computer checks each leg of the route to assure that the Harpoon Block II missile has the energy and control to execute all maneuvers and maintain the flight path and then creates an engagement plan consisting of the parameters needed by the store to execute the planned mission. Thus, with the GPS precision, there is no need for the terminal seeker and the accompanying pre-launch search size and range data required by Harpoon Block I missiles, as the missile will hit a precise latitude, longitude and altitude in the earth reference system.

Also, the GNU 25 of the Harpoon Block II missile can determine the pre-launch inertial position and velocity of the missile at the time of launch and, as such, will not require aircraft attitude, altitude or true air speed data loaded before launch. Therefore, to launch a Harpoon Block II missile from an aircraft 10 requires application of aircraft power, loading of the preplanned engagement plan and the release (i.e., initiating the store internal battery and deployment) at a predetermined launch point. Two of these requirements can be satisfied by an aircraft configured to operate a Harpoon Block I missile, such as by the operator "Selecting" the weapon station and "Releasing" the weapon. The third requirement, loading the engagement plan onto the memory 27 of the GNU, cannot be satisfied with conventional weapon systems. As such, the present invention provides a bypass apparatus 24.

The bypass apparatus 24 is electrically connected between the weapon control subsystem 18 and the store 12 (e.g., Harpoon Block II missile). Advantageously, the bypass apparatus comprises an application specific integrated circuit (ASIC) such that it only requires a small amount of space, however, the bypass apparatus may be embodied in other electrical circuitry if so desired. In this regard, the bypass apparatus can, but need not, be mounted within the umbilical cable 22 or into the aircraft pylon wiring. According to the invention, the bypass apparatus is adapted to transmit an engagement plan consisting of engagement plan parameters to the store such that the store can be launched from an aircraft adapted to control the operation of stores such as the SLAM missile or the Harpoon Block I missile.

Referring now to FIG. 4, the bypass apparatus 24 includes a number of sensors capable of monitoring signals transmitted between the weapon control subsystem 18 and the store 12. Typically, the bypass apparatus includes a power sensor 32 and a communication sensor 34. The power sensor is electrically connected to at least one of the three wires capable of providing the three-phase power from the aircraft 10 to the store. In this regard, the power sensor is capable of monitoring application of three-phase power over power wires. The communication sensor, on the other hand, is capable of monitoring the communication bus 35, such as the MK-82 Digital Data bus, for operating instructions transmitted to the store from the aircraft. For example, the communication sensor can monitor the communication bus for communications from the aircraft, including the states of "Enable" and "Clock" lines of the communication bus. In this regard, the communications transmitted from the aircraft can indicate the configuration of the aircraft in operating the store.

The bypass apparatus 24 also includes a controller 36 that is electrically connected to the power sensor 32 and the communication sensor 34. In this regard, the controller is capable of controlling operation of the bypass apparatus based upon conditions of the sensors. If the power sensor senses three-phase power is being applied to power lines, the power sensor sets its output to the controller to a true state. Otherwise, the power sensor sets its output to a false state. Similarly, the communication sensor monitors the states of the "Enable" and the "Clock" communication lines of the communication bus 35. If both the enable and the clock are active (high state), the communication sensor sets its output to the controller to a true state. Otherwise, the communication sensor sets its output to a false state.

More particularly, the controller 36 is capable of monitoring the state of the sensors 32 and 34 to thereby determine a mode of operation of the bypass apparatus 24. In this regard, the bypass apparatus can operate in one of three modes: "download", "upload" or "standby". The download mode of the bypass apparatus is defined by a false state of the power sensor and a true state of the communication sensor. In download mode, the controller operates the bypass apparatus as a slave device to allow engagement plan parameters to be loaded into a non-volatile memory 38 of the bypass apparatus, as described below. To allow the engagement plan parameters to be received by the bypass apparatus, the bypass apparatus includes a communication interface 40, which is electrically connected between the controller and the communication bus 35. The communication interface allows the controller and, thus, the bypass apparatus, to receive engagement plan parameters, as well as to transmit engagement plan parameters, over the communication bus.

The upload mode of the bypass apparatus 24 is defined by a true state of the power sensor 32 and a false state of the communication sensor 34, where the false state is maintained for more than a predefined period of time (e.g., 100 ms). In upload mode, the controller 36 operates the bypass apparatus as a master device to allow engagement plan parameters stored in the memory 38 to be uploaded to the store 12 via the communication interface 40 over the communication bus 35. And to facilitate only operating the store if the store is functioning properly, the bypass apparatus can initiate a built-in-test (BIT) of the store and require the store to pass the BIT prior to uploading the engagement plan parameters to the store. The bypass apparatus can also include a launch inhibit switch 42 that, if the store fails the BIT, can inhibit launch of the store by preventing the store intent to launch (ITL) and "Enabled" discrete signals from passing between the weapon control subsystem 18 and the store.

The standby mode of the bypass apparatus 24 is defined by true states of both the power sensor 32 and the communication sensor 34. In standby mode, the controller 36 sets the bypass apparatus in a standby state in which the bypass apparatus does not perform any active functions. In the standby mode, then, the weapon control subsystem 18 and the store 12 can communicate without any interaction with, or interference from, the bypass apparatus.

To provide power to the bypass apparatus 24, a power supply is electrically connected to the signal conditioning element. The power supply can comprise any of a number of elements but, in a preferred embodiment, the power supply comprises a DC-to-DC converter 44 electrically connected to the DC power line supplying DC power to the missile 12. The DC-to-DC converter can convert the DC power from the DC power line, e.g., 28 volt DC power, to levels for use by the bypass apparatus, preferably, +5 volts DC at 100 mA, and +/-15 volts at 300 mA. Also, to allow the bypass apparatus to operate in an expanded temperature range, particularly temperatures as low as -55° Celsius, the bypass apparatus can include a heater (not shown) capable of heating the elements of the bypass apparatus.

Figure 5A:
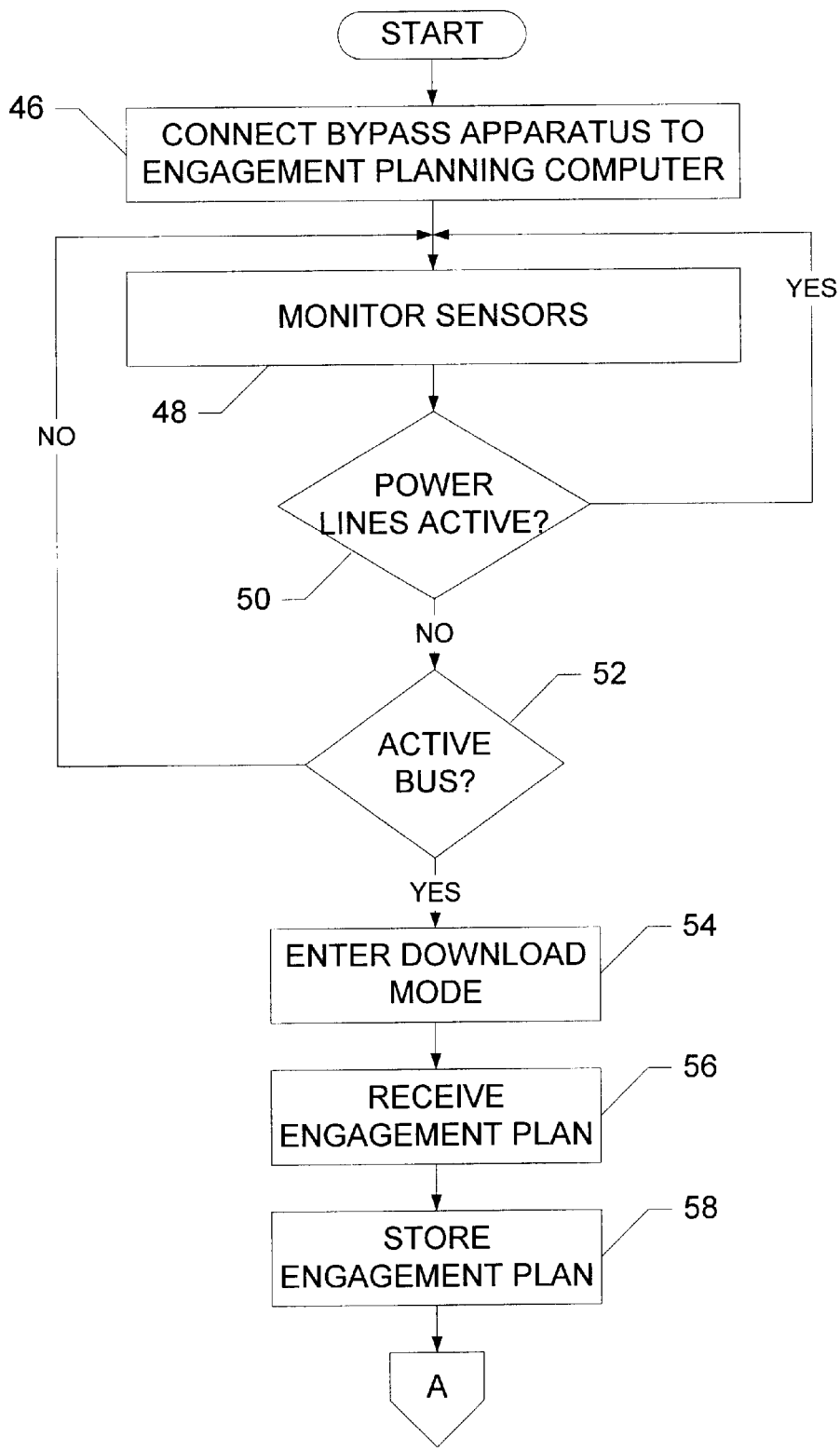
FIGS. 5A, 5B and 5C are flow charts illustrating various steps in a method of operating a store of a first predetermined type according to one embodiment of the present invention.
Figure 5B:
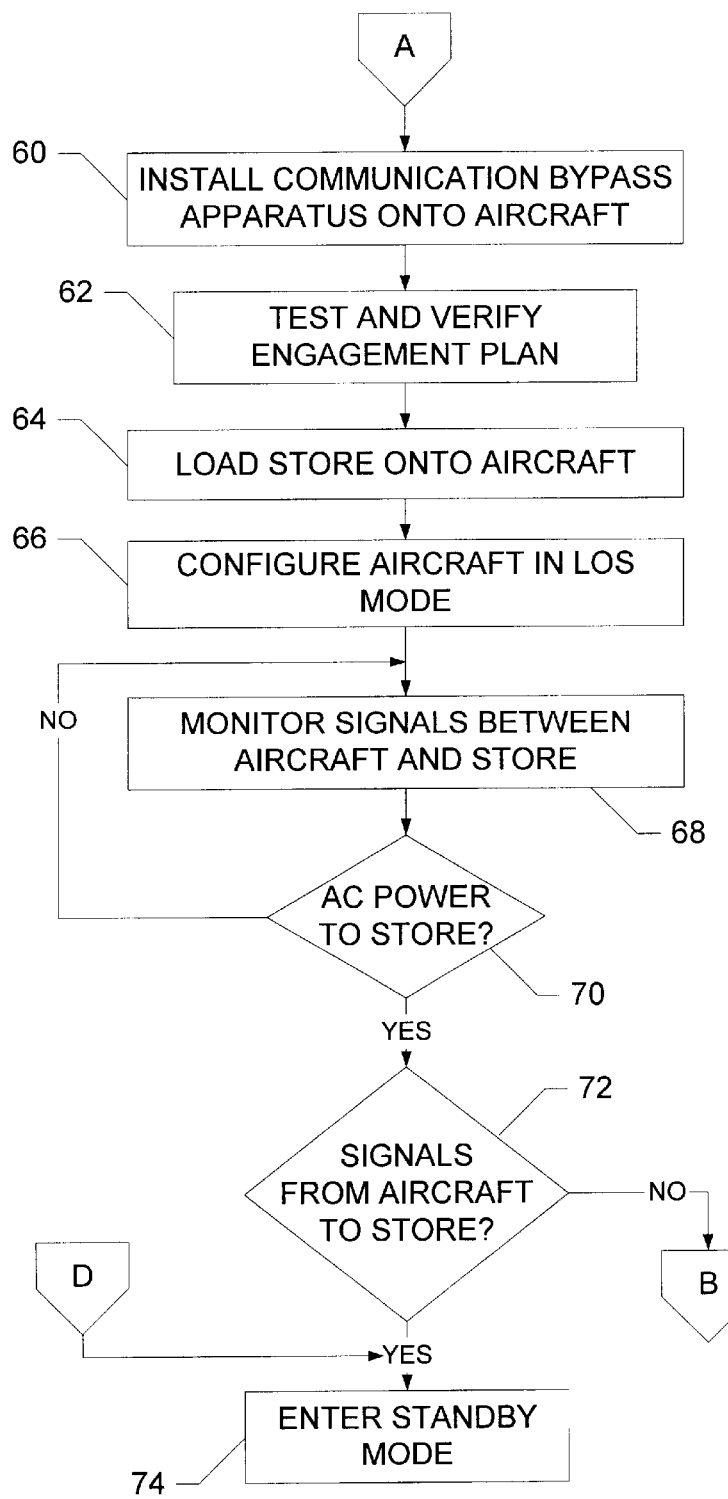
Figure 5C:
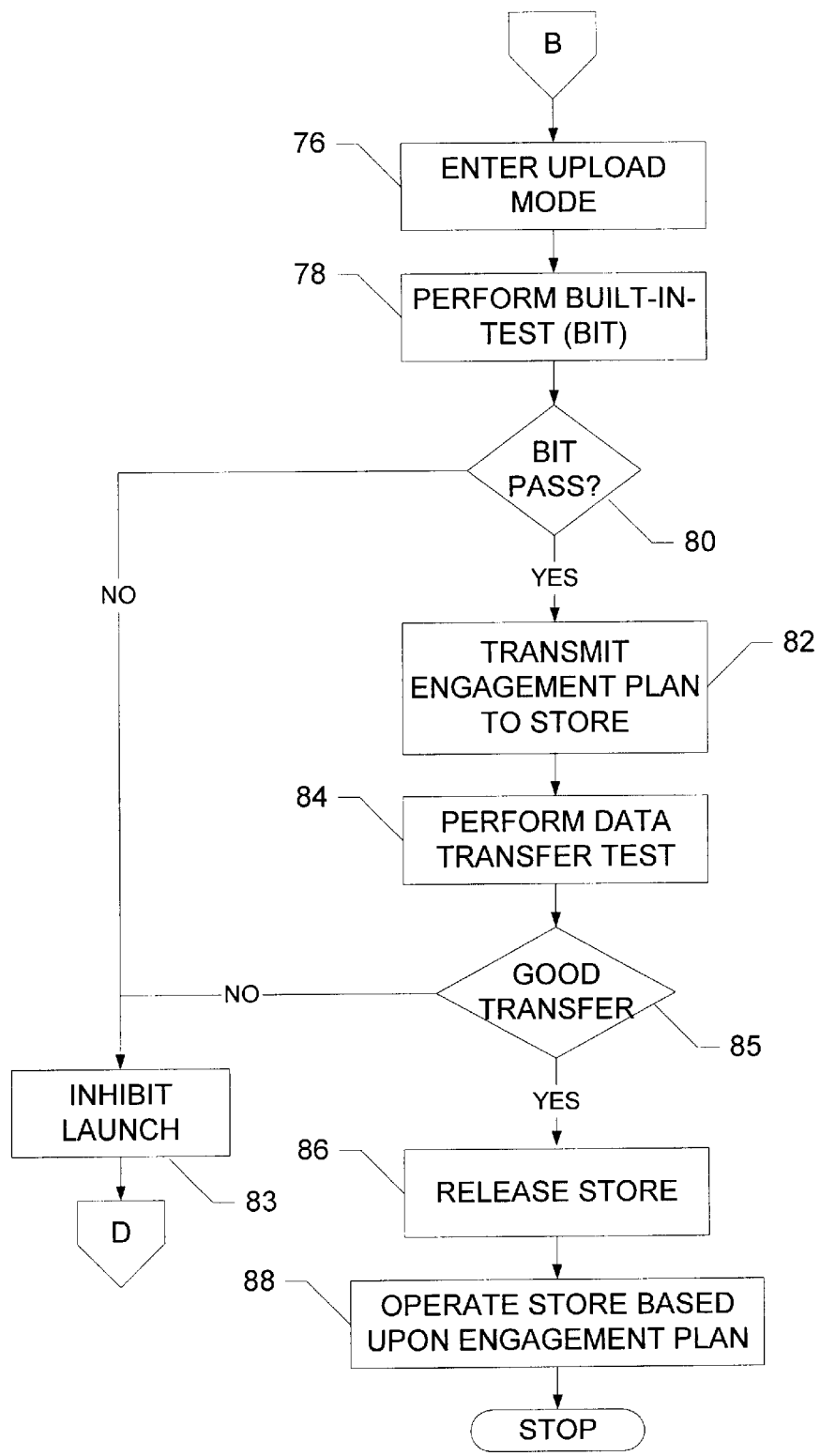

Referring now to FIGS. 5A–5C, operation of the bypass apparatus 24 begins by storing engagement plan parameters into the memory 38. The engagement plan parameters can be stored in the bypass apparatus in any one of a number of different manners. But according to one embodiment, shown in block 46, the bypass apparatus, or the umbilical cable 22 including the bypass apparatus, can be removed from the aircraft 10 and thereafter electrically connected to an engagement-planning computer to download the engagement plan into the bypass apparatus.

After the bypass apparatus 24 is connected to the engagement planning computer, the controller 36 monitors outputs of the power sensor 32 and communication sensor 34, as shown in block 48. In this regard, after the bypass apparatus is connected to the engagement planning computer, the "Enable" and "Clock" communication lines of the communication bus 35 are activated, but no three-phase power is delivered via the three-phase power lines. Thus, the output of the communication sensor is set to the true state, while the output of the power sensor is set to the false state. The controller detects the states of the sensors, as illustrated in blocks 50 and 52 and, recognizing the states of the sensors as defining the download mode of the bypass apparatus, enters the download mode. In the download mode, the controller operates the bypass apparatus as a slave device to the engagement planning computer, which serves as the master device, as shown in block 54. In operating the bypass apparatus as the slave device, the controller sets the communication interface 40 to a "receive" mode allowing the engagement plan parameters to be received by the bypass apparatus by being clocked into registers of the communication interface, as shown in block 56. The controller also sets the memory 38 to the "read" mode, which allows the engagement plan parameters from the communication interface registers to be stored into the memory, as shown in block 58.

After the operating parameters have been stored in the memory 38, the bypass apparatus 24 is installed onto the aircraft 10, as shown in block 60. Next, to ensure proper operation, the bypass apparatus is preferably tested, as shown in block 62. The bypass apparatus can be tested according to any of a number of methods but, according to one embodiment, the bypass apparatus is tested with an AWM-103 model Aircraft Weapon Systems Tester or any tester having MK-82 test capability.

The AWM-103 tester, which is typically used to verify the condition of the aircraft weapon control subsystem 18 prior to loading the store 12 onto the pylon, can interface directly to the pylon connector or the umbilical cable missile connector. Thus, the bypass apparatus can be tested as a part of a test of the weapon control subsystem when the umbilical cable 22 including the bypass apparatus is connected to the pylon of the aircraft.

It will be appreciated, however, that the umbilical cable 22 including the bypass apparatus 24 need not be connected to the pylon of the aircraft 10 to test the bypass apparatus. In this regard, the AWM-103 tester can test the bypass apparatus within the umbilical cable in a standalone umbilical cable test. It will also be appreciated that testing the bypass apparatus requires no modification to the AWM-103 Harpoon Block II test equipment or software, as the bypass apparatus autonomously senses the test mode of operation, which appears to the bypass apparatus as though the bypass apparatus were operational upon the aircraft, as described below. Also, in either test arrangement, the AWM-103 tester can verify the engagement plan parameters, as well as check the integrity of the umbilical cable/bypass apparatus connectors and wiring.

As shown in block 64, after the bypass apparatus 24 has been tested and the engagement plan parameters verified, the store 12 (e.g., Harpoon Block II missile) is loaded onto the aircraft 10, as such is well known to those skilled in the art. It will be appreciated that, in launching a store such as the Harpoon Block II missile from an aircraft adapted to control the operation of Harpoon Block I missiles, the aircraft is configured to apply power (three-phase and DC) to the store and release the store without loading any operating instructions onto the store. And as the aircraft does not transmit any data to the store when the aircraft operates in LOS mode, the aircraft is preferably configured in LOS mode after the store is loaded onto the aircraft, as shown in block 66. As such, the aircraft can deliver the required power to the store and release the store without transmitting operating instructions (i.e., engagement plan parameters) to the store.

After the aircraft 10 has been configured in LOS mode, the bypass apparatus 24 monitors signals between the aircraft and the store 12, as shown in block 68. Particularly, the power sensor 32 monitors three-phase, or AC power, delivered to the store from the aircraft, and the communications sensor 34 monitors communications transmitted to the store from the aircraft via the communications bus 35, as shown in blocks 70 and 72. When the controller 36 identifies a true state of both the power sensor and the communication sensor, the controller operates the bypass apparatus in the standby mode, as shown in block 74. In standby mode, the controller sets the communication interface to a high impedance state such that the communication interface does not input data from, or output data to, the communication bus. The controller can be taken out of standby mode in any number of different manners. In one embodiment, for example, the controller sets a latch upon entering standby mode to thereby prevent any communications between the bypass apparatus and the communication bus. The latch then remains set until the three-phase power has been cycled off and reapplied.

If the controller 36 identifies a true state of the power sensor 32 and a false state of the communication sensor 34 for at least a predefined period of time (e.g., 100 ms), the controller enters the upload mode where the controller operates the bypass apparatus 24 as a master device to the store 12 slave device, as shown in block 76. In the upload mode, the controller sets the communication interface 40 to an "output" mode, and sets the memory 38 to a "write" mode, which allows the engagement plan parameters stored in the memory to be clocked into the memory of the store. Preferably, as shown in blocks 78 and 80, before transferring the engagement plan parameters to the store, the controller performs a store Built-In-Test (BIT), as such is known. If the store responds with a "good data" word over the communication bus 35 to the communication interface, indicating that the store passed the BIT, the controller continues with the transfer of the engagement plan parameters from memory, as illustrated in block 82. However, if the store does not respond with the "good data" word, thus indicating that the store did not pass the BIT, the controller prevents the transfer of the engagement plan parameters and sets the launch inhibit switch 42 to an open state, which prevents the Intent-To-launch (ITL) discrete signal (transmitted to launch the store) from reaching the store, as illustrated in block 83. The launch inhibit switch also prevents the store "Enabled" discrete signal from reaching the weapon control subsystem 18. Thus, the controller operates the bypass apparatus in standby mode. Also, with the ITL and Enabled signals interrupted, the aircraft crew will not receive an expected response to the "Release" command and, thus, can abort the launch of the store.

Upon transfer of the engagement plan parameters, the store 12 can perform a data transfer test whereby the store check all transferred data for parity and checksum errors, as shown in block 84. As known to those skilled in the art, the Harpoon MK-82 data transfer consists of 16-bit data words that each include a 17th bit added to yield odd "logic ones" parity for each set of 17 bits. Also, the total number of bits of data transferred that have the logic "one" state can be numerically added to produce a "checksum" word, which is transferred along with the engagement plan parameters. These parity bits and the checksum word generated by the engagement planning computer allow a device that receives the engagement plan parameters to verify the accuracy of the transfer.

Thus, the store 12 can also calculate the parity of each set of 17 bits and numerically total the logic "ones" received. The store can then compare the calculated values to the parity and checksum values generated by the engagement planning computer and transferred to the store. If the transferred values match with the calculated values, the store sets a "good data" word in the output register that gets clocked back to the MK-82 sending device (i.e., the bypass apparatus 24), thereby allowing the bypass apparatus, acting as the MK-82 master, to ascertain that the transfer was successful.

More particularly, after transferring the engagement plan parameters to the store 12, the controller 36 can check the response word from the store to determine if the transfer was successful, as shown in block 85. If the controller receives a "good data" word from the store, the transfer was successful, and the controller allows the process to continue to release the store, as shown in block 86. If the controller does not receive a "good data" word, however, the controller can prevent launch of the store by placing the bypass apparatus in the standby mode, as shown in block 83. In this regard, the controller opens the launch inhibit switch 42, thus preventing the ITL signal from reaching the store and preventing the "Enabled" signal from reaching the weapon control subsystem 18. Thus, the launch interrupt switch prevents the aircraft crew from receiving the expected response to the "Release" command and, as before, the crew can then abort launch of the store.

After the engagement plan parameters have been successfully transmitted to the store 12, the store can be released from the aircraft 10, as shown in block 86. The store can be released according to any one of a number of different methods. For example, the weapon control subsystem 18 can include a release inhibit timer in the LOS mode that prevents initiating a release command for a period of time, such as thirteen seconds, after applying three-phase power to the store. The period of time is selected to allow sufficient time for the controller 36 to conduct the BIT. At the end of the time period, a "Release" switch indicator will automatically illuminate alerting the crew that the weapon control subsystem is ready to accept the "Release" command. An additional amount of time, such as 15 seconds, is then allowed for transfer of the engagement plan parameters before initiating the "Release" command.

After initiating the "Release" command, if the store has passed the BIT and the engagement plan parameters have been successfully transferred to the store, the weapon control subsystem and, thus, the crew will receive the store "Enabled" discrete signal. And upon release of the store, the weapon control subsystem will typically receive an indication that the store has separated from the pylon. In contrast, other weapon control subsystems may require the crew work through a checklist without the aid of such status indicators. Upon release, the store operates according to the engagement plan parameters (i.e., operating instructions) to fly to and impact a planned target, as shown in block 88.

Therefore, the system, bypass apparatus and method of embodiments of the present invention allow a store of the first predetermined type to be provided with an engagement plan in-flight. Advantageously, the engagement plan can be provided to the store without modifying the aircraft wiring and/or the mission control subsystem of the aircraft. Also, by providing the engagement plan to the store in-flight, the system, bypass apparatus and method of embodiments of the present invention also do not require the memory banks in the store to be continuously in a powered-on state.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A system for operating and releasing a store of a first predetermined type, said system comprising:

an aircraft adapted to control the operation of stores of a second predetermined type, wherein the store is releasably secured to said aircraft, and wherein said aircraft is capable of releasing the store; and a bypass apparatus carried by the aircraft, said bypass apparatus being adapted to facilitate operation of the store and capable of storing operating instructions, wherein said bypass apparatus is also capable of transmitting the operating instructions into the store such that after the aircraft releases the store the store is capable of operating according to the operating instructions.

2. A system according to claim 1, wherein said bypass apparatus is also capable of monitoring communications between the aircraft and the store for operating instructions transmitted from the aircraft, and wherein said bypass apparatus transmits the operating instructions when no operating instructions are transmitted from said aircraft.

3. A system according to claim 1 further comprising an umbilical cable disposed between said aircraft and the store, wherein said bypass apparatus is disposed within said umbilical cable.

4. A system according to claim 1, wherein said bypass apparatus is also capable of verifying the operating instructions.

5. A system according to claim 1, wherein said aircraft is capable of being configured such that a store of the first predetermined type is capable of operating independent of operating instructions from the aircraft.

6. A system according to claim 5, wherein said aircraft is capable of being configured in a line-of-sight mode.

7. A system according to claim 1, wherein the store comprises a store of a Harpoon Block II type, and wherein said aircraft comprises an aircraft adapted to control the operation of stores of one of a SLAM type and a Harpoon Block I type.

8. A bypass apparatus adapted to facilitate operating a store of a first predetermined type from an aircraft adapted to control the operation of stores of a second predetermined type, said bypass apparatus comprising:

a memory capable of storing operating instructions, wherein the operating instructions are adapted for a store of the first predetermined type; and a controller capable of transmitting the operating instructions into the store during flight of the aircraft such that after the aircraft releases the store the store is capable of operating according to the operating instructions.

9. A bypass apparatus according claim 8, wherein said bypass apparatus is adapted to be disposed within an umbilical cable of an aircraft.

10. A bypass apparatus according to claim 8, wherein said controller is also capable of verifying the operating instructions.

11. A bypass apparatus according to claim 8, wherein said controller is capable of transmitting the operating instructions into the store when no operating instructions are transmitted from the aircraft.

12. A bypass apparatus according to claim 11 further comprising a communication sensor capable of monitoring communications between the aircraft and the store of the first predetermined type for operating instructions transmitted from the aircraft.

13. A bypass apparatus according to claim 8, wherein said bypass apparatus is adapted to facilitate operating a store of a Harpoon Block II type from an aircraft adapted to control the operation of stores of one of a SLAM type and a Harpoon Block I type.

14. A method of operating a store of a first predetermined type from an aircraft adapted to control the operation of stores of a second predetermined type, said method comprising:

storing operating instructions within a bypass apparatus, wherein the operating instructions are adapted for a store of the first predetermined type;

configuring the aircraft such that a store of the first predetermined type is capable of operating independent of operating instructions from the aircraft;

transmitting the operating instructions stored by the bypass apparatus into the store of the first predetermined type during flight of the aircraft; and releasing the store of the first predetermined type from the aircraft and thereafter operating the store of the first predetermined type according to the operating instructions.

15. A method according to claim 14 further comprising monitoring communications between the aircraft and the store for operating instructions transmitted from the aircraft, wherein transmitting the operating instructions comprises transmitting the operating instructions into the store when no operating instructions are transmitted from the aircraft.

16. A method according to claim 14 further comprising verifying the operating instructions after storing the operating instructions within the bypass apparatus.

17. A method according to claim 14 further comprising testing the store of the first predetermined type and thereafter preventing transmission of the operating instructions and release of the store when the store fails the test.

18. A method according to claim 14, wherein configuring the aircraft comprises configuring the aircraft in a line-of-sight mode.

* * * * *